United States Patent
Abe (10) Patent No.: US 6,466,955 B1
(45) Date of Patent: Oct. 15, 2002

(54) INFORMATION PROCESSING APPARATUS AND METHOD FOR DISPLAYING SAME SHARED DATA IN DIFFERENT FORMATS AMONG DIFFERENT TERMINALS

(75) Inventor: Toyoko Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 1431 days.

(21) Appl. No.: 08/755,353

(22) Filed: Nov. 25, 1996

Related U.S. Application Data (63) Continuation of application No. 08/299,642, filed on Sep. 2, 1994, now abandoned.

(30) Foreign Application Priority Data

Sep. 3, 1993 (JP) .............................................. 5-219354

(51) Int. Cl.[7] .............................................. G06F 17/21
(52) U.S. Cl. ...................................................... 707/526
(58) Field of Search ................................. 395/788, 790, 395/791, 806, 329, 330, 331, 332, 340, 335; 345/329, 330, 331, 332, 340, 335, 302; 707/526, 528, 529

(56) References Cited

U.S. PATENT DOCUMENTS

| | | | | |
|---|---|---|---|---|
| 5,107,443 A | * | 4/1992 | Smith et al. ................. | 395/158 |
| 5,220,657 A | * | 6/1993 | Bly et al. .................... | 395/425 |
| 5,379,374 A | * | 1/1995 | Ishizaki et al. ............. | 395/155 |
| 5,392,400 A | * | 2/1995 | Berkowitz et al. .......... | 395/200 |

OTHER PUBLICATIONS

Klinker, "An Environment for Telecollaborative Data Exploration", Visualization, 1993 Conference, pp. 110–117.*
"Hutton Buying PC–Based NCR Workstations for Branch Network", American Banker, 10/86, p. 12.*
"Trading department support systems", *Wall Street & Technology*, v10, n5, p53(11), 1/93.*
Ishii et al., "Design of TeamWorkStation: A Realtime Shared Workspace uusing Desktops and Computer Screens", In Proceedings of IFIP WG8.4 Conference on Multi–User Interfaces and Applications, Sep., 1990, pp. 131–142.*
Ahuja et al., "A comparison of Application sharing mechanisms in real time desktop conferencing systems", Proceedings of COIS'90, Apr., 1990, pp. 238–248.*
Ishii, "TeamWorkstation: Towards a seamless shared workspace", In Proceddings of CSCW '90, Oct. 1990, pp. 13–26.*
Proceeding of Tri Comm '91, IEEE Conference on Sommunications Software: Communications for Distributed Applications and and Systems, Chapel Hill, NC, Apr. 18–19, 1991.

* cited by examiner

*Primary Examiner*—Stephen S. Hong
(74) *Attorney, Agent, or Firm*—Foley & Lardner

(57) ABSTRACT

An information processing apparatus comprises a first terminal device and a plurality of second terminal devices. The first terminal device includes a data processing device for processing input information and outputting a data processing result, and a broadcast communication device for broadcasting the data processing result. Each second terminal device includes an input processing device for processing input a data and converting to input processing information that can be processed by the data processing device and a visualization processing device means for converting the data processing result transmitted by the broadcast communication device to a visualization information specified by a user. Additionally, the data processing device in the first terminal device processes the input processing information from the input processing device of the second terminal device. The broadcast communication device transmits the same processing result to visualization information conversion device in the other second terminal devices.

The respective visualization processing devices convert the processing result to visualization information formats set by the users for displaying the same data processing differently. the data processing result.

13 Claims, 11 Drawing Sheets

PRIOR ART

INFORMATION PROCESSING APPARATUS AND METHOD FOR DISPLAYING SAME SHARED DATA IN DIFFERENT FORMATS AMONG DIFFERENT TERMINALS

This is a continuation of application Ser. No. 08/299,642, filed Sep. 2, 1994, now abandoned.

BACKGROUND OF THE INVENTION

The present invention relates to an art for sharing a data processing result synchronously and in real-time among a group of remotely-located users at respective terminal devices, especially an art that enables users to see at respective terminal devices in different graphical forms based on the same data processing result.

First of all, an information processing device of prior art where a plurality of users share a data processing result at respective terminal devices is explained.

Figure 8:
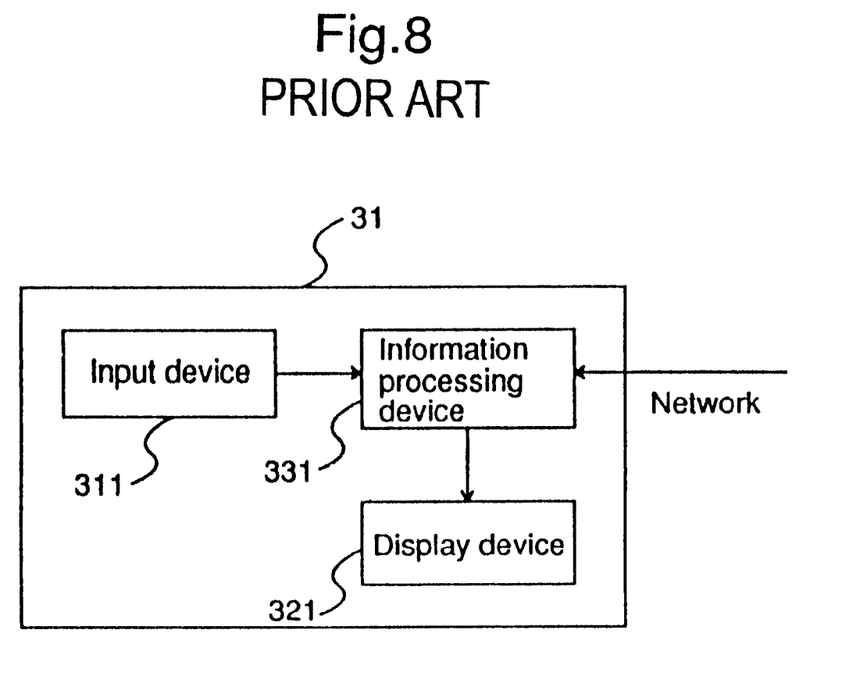
FIG. 8 is a block diagram showing an example of a prior art terminal device.

FIG. 8 shows a configuration of a terminal device of an information processing device of prior art.

A terminal device 31 comprises an input device 311 (a keyboard or a mouse, for example), a display device 321 (a CRT, for example) and an information processing device 331 (a CPU, for example).

In the terminal device 31, the input device 311 is connected with the information processing device 331 and the display device 321 is connected with the information processing device 331, thus each terminal device is configured.

As such a configuration example, there are a workstation, a personal computer and the like.

Next, an information processing device of XTV (X-window Terminal View) system for sharing at each terminal device a data processing result using a plurality of the above-mentioned terminal devices is explained.

Figure 9:
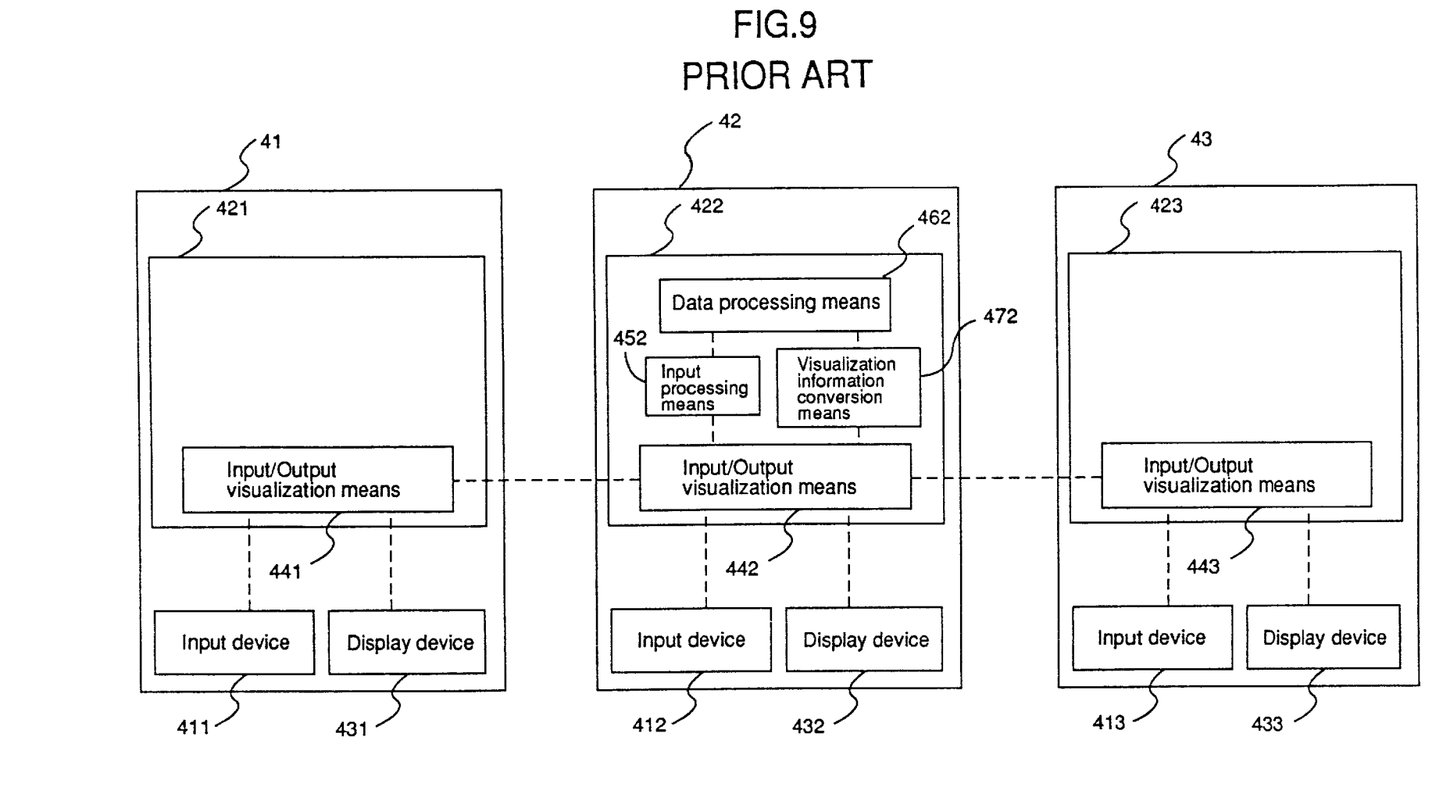
FIG. 9 is a block diagram showing a processing device of prior art.

FIG. 9 shows a configuration of an information processing device of XTV (X-window Terminal View) system, where terminal devices 41, 42 and 43 are connected to each other via a network (ISDN or High-speed dedicated line, for example). The dotted lines in FIG. 9 show communication lines (channels) of information.

Here, as an example, each terminal device shares the same data processing result and the same data processing result is displayed at each terminal device in the form of table or graph.

In the same way as the above-mentioned terminal device 31, the terminal device 41 is configured from an input device 411, an information processing device 421 and a display device 431. In addition, an input/output visualization means 441 exists in the information processing device 421.

This input/output visualization means 441 transmits an input information (information on a pressed key on a keyboard, for example) to other input/output visualization means or receives an information transmitted from the terminal device and lets the display device 431 display the information.

In the same way as the terminal device 41, the terminal device 43 is configured from an input device 413, an information processing device 423 and a display device 433. In addition, an input/output visualization, means 443 exists in the information processing device 423.

The terminal device 42 is configured from an input device 412, an information processing device 422 and a display device 432.

In addition, an input/output visualization means 442 same as the input/output visualization means 441 exists in the information processing device 422.

Moreover, an input processing means 452, a data processing means 462 and visualization information conversion means 472 exist in the information processing device 422.

The input processing means 452 input processes data input through the input/output visualization means 442 so that the data processing means 462 can can perform data processing, outputs input processing information.

The data processing means 462 processes the input processing information and outputs a processing result thereof.

The visualization information conversion means 472 converts the processing result by the data processing means to predetermined visualization information (information for displaying a data processing result in a form of graph, for example).

Figure 10:
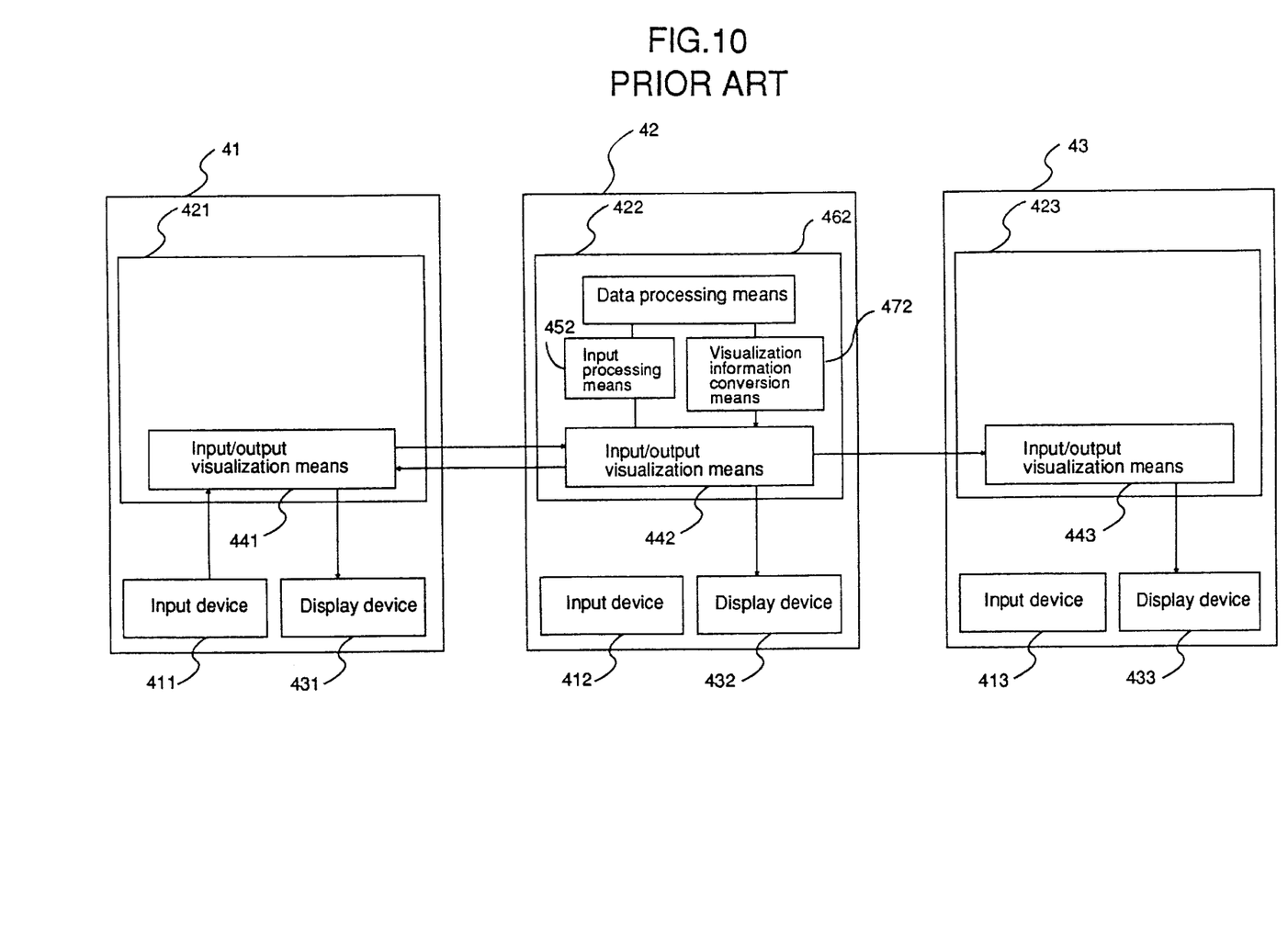
FIG. 10 is a chart showing a flow of information from the terminal device 41 to the terminal devices 42 and 43 in the processing device of prior art.
Figure 11:
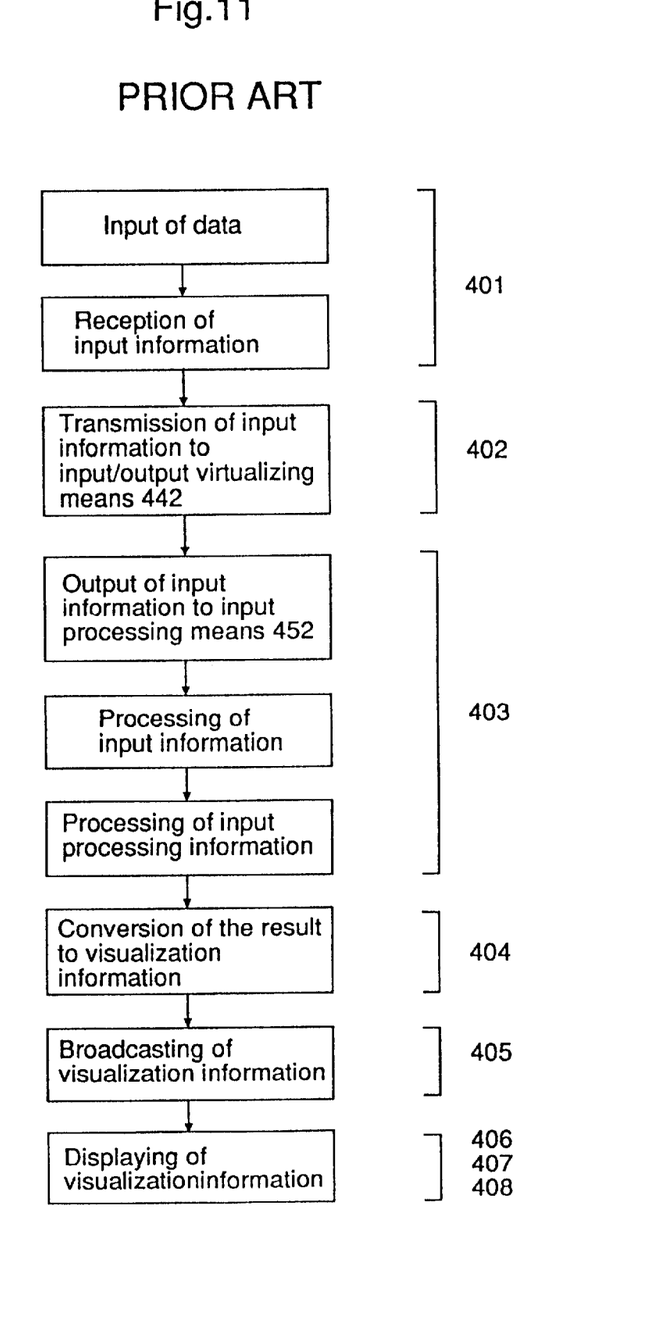
FIG. 11 is a chart of processing flow corresponding to each step of information flow shown in FIG. 10.

Next, FIGS. 10 and 11 show data flow input at the input device 411 in the terminal device 41 for displaying the data processing result.

FIG. 10 is a chart showing a flow of information from the terminal device 41 in the information processing device shown in FIG. 9 to the terminal device 42 and 43.

FIG. 11 is a chart showing a flow of information shown in FIG. 10 by the form of processing flow according to each step.

When data input using the input device 411 in the terminal device 41 (step 401), the input/output visualization device 441 transmits an input information (information on a pressed key on a keyboard, for example) to the input/output visualization means 442 in the terminal device 42. (step 402). The input/output visualization means 442 inputs a received input information and outputs the received input information to the input processing means 452. (step 403).

The input processing means 452 input processes a data so that the data processing means 462 can perform data processing, converts it to an input processing information and outputs a result to the data processing means 462. (step 403).

The data processing means 462 processes data based on the input processing information, outputs a processing result thereof to the visualization information conversion means 472. (step 403).

The visualization information conversion means 472 converts a data processing result to visualization information for displaying the data in the form specified by a user, for example, in the form of bar graph if a user specified it, passes the visualization information to the input/output visualization means 442. (step 404).

The input/output visualization means 442 transmits the received visualization information to the input/output visualization means 441 in the terminal device 41 and the input/output visualization means 443 in the terminal device 43. (step 405).

The input/output visualization means 441 in the terminal device 41 lets the display device 431 display the received visualization information. (step 406).

Similarly to this, the input/output visualization means 443 in the terminal device 43 lets the display device 433 display the received visualization information. (step 407).

The input/output visualization means 442 in the terminal device 42 lets the display device 432 display the same visualization information as that transmitted to the terminal device 41 and terminal device 43. (step 408).

Thus, the prior art terminal devices uniformly let terminal devices display the same data processing result.

In the above-mentioned information processing device of prior art, however, there is a problem in that each user cannot refer the data processing result in a favorite expressive form since the prior art, broadcasts the same data processing result to all users in the same form.

SUMMARY OF THE INVENTION

It is an object of the present invention to provide an information processing art enabling users to see the same data processing result in different forms at respective terminal device when the plural users share a data processing result in real-time at respective terminal devices.

The object of the present invention is achieved by an information processing apparatus comprising a first terminal device and a plurality of second terminal devices. The first terminal device includes a data processing means for processing an input processing information and outputting a data processing result, and a broadcast communication means for broadcasting the data processing result to the second terminal devices. Each second terminal device includes an input processing means for processing input data for conversion to input processing information that can be processed by the data processing means, and an visualization information conversion means for converting the data processing result transmitted by the broadcast communication means to a visualization information specified by a user.

By the present invention configured as above, an input processing information from an input processing means in a terminal device is processed in a data processing means, the same processing result is transmitted to the visualization processing means in other terminal devices.

Then, a visualization information conversion means in each terminal device independently converts the processing result to visualization information, simultaneously enabling different or same visualization processing at respective terminal devices.

Therefore, users who are sharing the same data processing result can see the visualized information in the same form or different forms at the same time.

Also, the present invention can operate the above-mentioned broadcast communication means as an independent terminal that provide a data processing means in each terminal device and broadcast the input processing information to each data processing means using the broadcast communication means.

Explained as above, the present inventions, enables sharing of the same visualized information like prior art but the visualization processing means in each terminal device can selectively perform different kinds of visualization processing. As a result, it becomes possible to share the same data processing result in different visualization forms.

DESCRIPTION OF THE PREFERRED EMBODIMENTS

Figure 1:
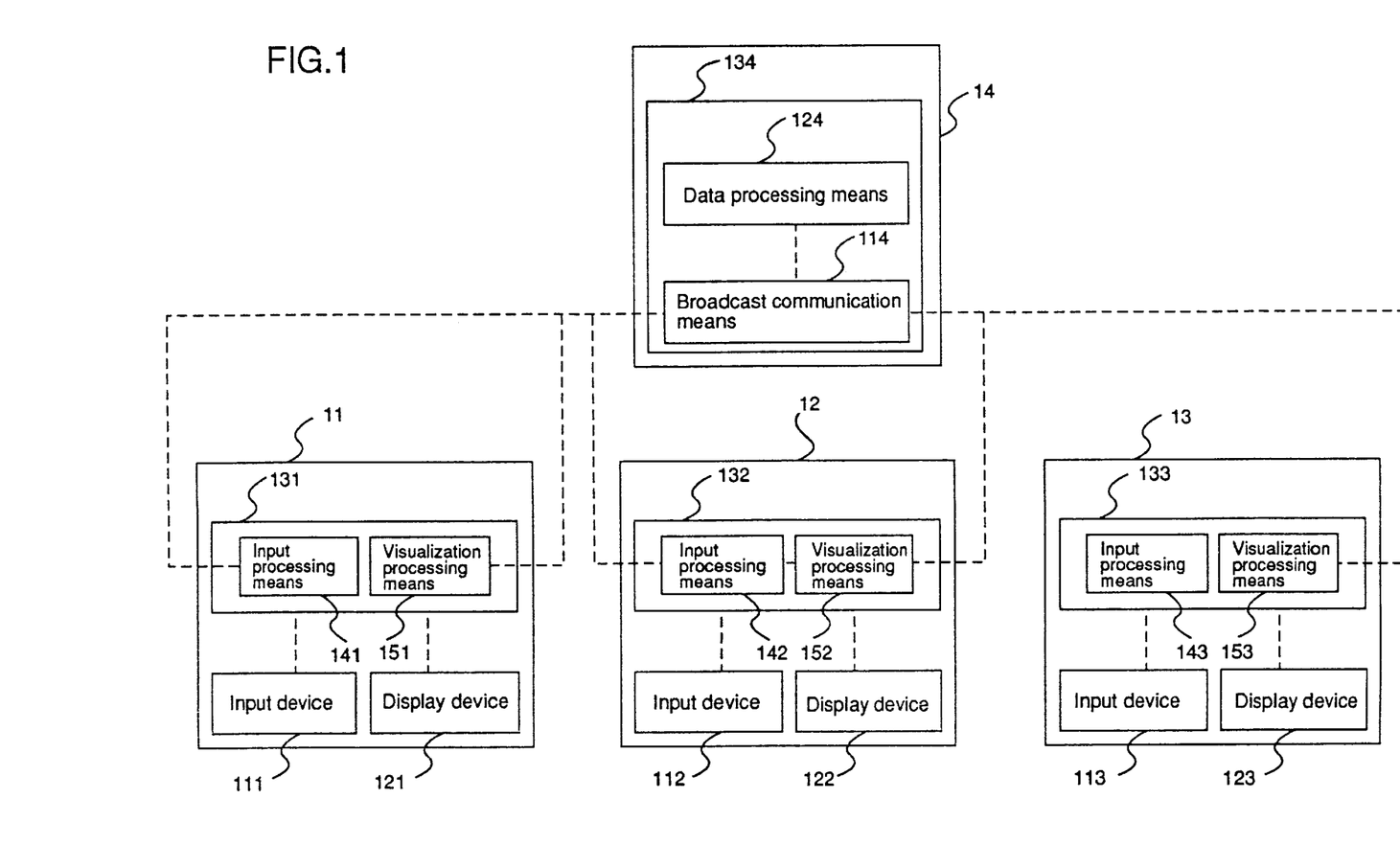
FIG. 1 is a block diagram showing the first embodiment of the present invention.

FIG. 1 is a block diagram of the first embodiment, where first, second, and third terminal devices 11, 12 and 13 are connected to a fourth terminal device 14 via a network (ISDN or High-speed dedicated line).

The first terminal device 11 has an input device 111, a display device 121 and an information processing device 131.

The input device 111 is a device for inputting data, such as a keyboard or a mouse.

The display device 121 is a device for displaying a data processing result, such as a CRT.

The information processing device 131 has an input processing means 141 and a visualization information conversion means 151.

The input processing means 141 processes data input through the input device 111 and converts the data to input processing information necessary for processing by a data processing means 124 of the fourth terminal device 14.

Specifically, 'the input processing information necessary for processing' is, for example, information requesting to execute an operation specified by clicking a command in a window on a CRT screen of the display device 121. In this case, the command in the window displayed on the CRT is clicked at first using a mouse. Then, the input processing means 141 converts information showing that the command has been clicked to information requesting the data processing means 124 to execute the operation specified by the command.

Further, the input processing means 141 generates additional information necessary for a broadcast communication control means 114 of the terminal device 14 to broadcast the information. This additional information is, for example, an addressing information for addressing terminals to be broadcasted a processing result by the data processing means 124.

The visualization processing means 151 converts the data processing result from the data processing means 124 to a visualization information format specified by a user.

For example, if the user at the terminal device 11 requests to display the data processing result in bar graph, the processing result, for example, numerical data from the data processing means 124 is converted to information for displaying a bar graph.

Similar to the first terminal device 11, the second terminal device, configured from an input device 112, a display device 122 and an information processing device 132 in the same way as the terminal device 11.

Also, the information processing device 132 is configured from an input processing means 142 and a visualization information conversion means 152 in the same way as the information processing device 131.

Similarly the third terminal device 13 has an input device 113, a display device 123 and an information processing device 133 in the same way as the terminal device 11.

Also, the information processing device 133 is configured from an input processing means 143 and a visualization information conversion means 153 in the same way as the information processing device 131.

The fourth terminal device 14 has an information processing device 134, which includes configured from a broadcast communication control device 114 and a data processing means 124.

The broadcast communication means 114 outputs only input processing information among information transmitted from the input processing means 141, 142 and 143, and stores any additional information necessary for broadcasting communication.

When receiving a data processing result that is processed in the data processing means 124 from the data processing means 124, the broadcast communication means 114 broadcasts the data processing result to the terminal device addressed by the additional information.

The data processing means 124 processes data based on the input processing information transmitted from the broadcast communication control means 114, and transmits a data processing result to the broadcast communication control means 114 again.

Next, operation of the information processing device according to the first embodiment described above is explained.

Figure 2:
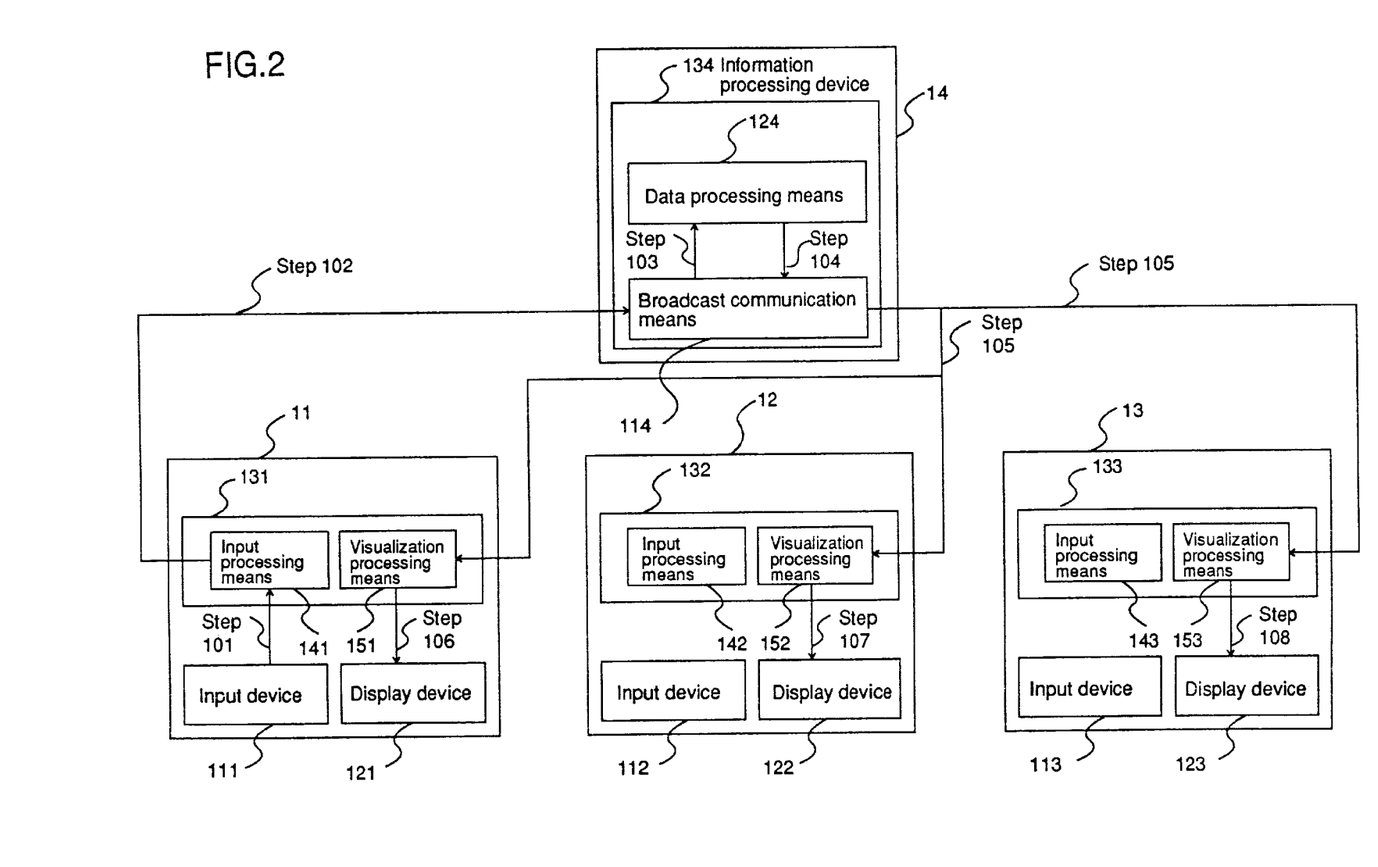
FIG. 2 is a chart showing a flow of information from the terminal device 11 to the terminal devices 12 and 13 in the first embodiment.

FIG. 2 is a chart showing a flow of information from the terminal device 11 to the terminal devices 12, 13 and 14 in the first embodiment.

Figure 3:
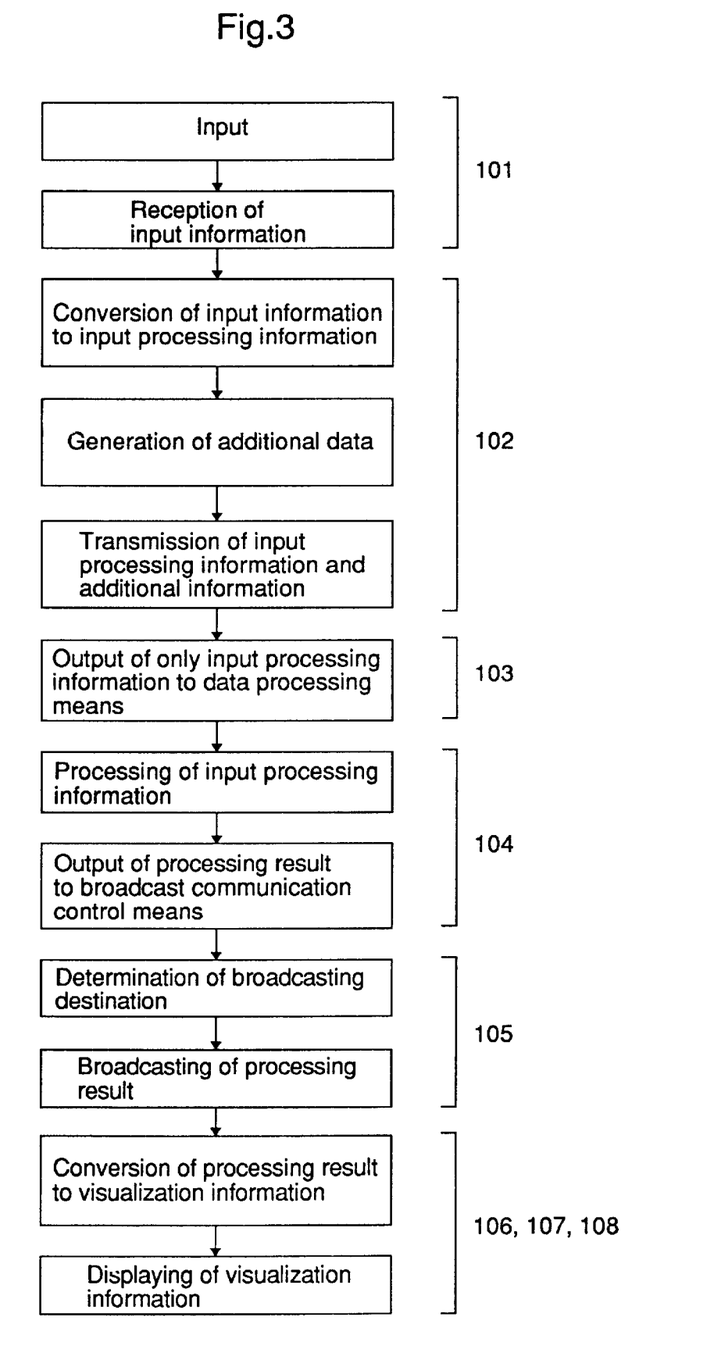
FIG. 3 is a chart of processing flow corresponding to each step of information flow shown in FIG. 2.

FIG. 3 is a chart showing a processing flow corresponding to each step of flow of information shown in FIG. 2.

A case of displaying the same data processing result displayed in forms of table and graph in the terminal devices as an example sharing a data processing result among terminal devices is considered in this embodiment, where the visualization processing means 151, 152 and 153 visualize the data processing result from the data processing means 124 in the form of table, bar graph and polygonal line graph.

First, when data is input to a table displayed by the display device 121 in the terminal device 11 from the input device 111, an input information (information that the key "5" on the keyboard has been pressed, for example) is input to the input processing means 141. (step 101).

The input processing means 141 determines how to process the input information and transmits input processing information necessary for the processing to the broadcast communication control means 114. (step 102).

Additionally, the input processing means 141 transmits additional information for broadcasting the data processing result to the terminal devices 11, 12 and 13 to the broadcast communication control means 114. (step 102).

The broadcast communication control means 114 outputs only input processing information among received information to the data processing means 124. (step 103).

The data processing means 124 executes a calculation according to the received input information, passes a data processing result to the broadcast communication control means 114. (step 104).

The broadcast communication control means 114 broadcasts a processing result to the visualization processing means 151, 152 and 153 based on the additional information. (step 105).

The visualization processing means 151 converts the received data processing result to visualization information for displaying the data in the form of table, and lets the display device 122 display a table. (step 106).

The visualization information conversion means 152 converts the same data processing result as that received by the visualization processing means 151 to visualization information for displaying the data processing result as a bar graph, and lets the display device 122 display a bar graph. (step 107).

The visualization processing means 153 converts the same data processing result as that received by the visualization processing means 151 to visualization information for displaying the data processing result as a polygonal line graph, and lets the display device 123 display a polygonal line graph. (step 108).

Like this, the same data processing result is displayed in different forms in respective terminal devices.

It is to be noted that while the visualization processing means 151, 152 and 153 respectively perform one kind of visualization processing for each in this embodiment, however, it is possible for the visualization processing means to select arbitrary visualization processing to the same data such as table, bar graph, polygonal line graph or the like.

Furthermore, it is also possible to configure the visualization processing means 151, 152 and 153 for displaying the same text in different languages such as English, Japanese and German, other than numerical data.

In addition, it is possible to share the same displayed information by making the visualization processing same.

Also the number of application programs run by a data processing device and that of terminal devices are not limited.

Figure 4:
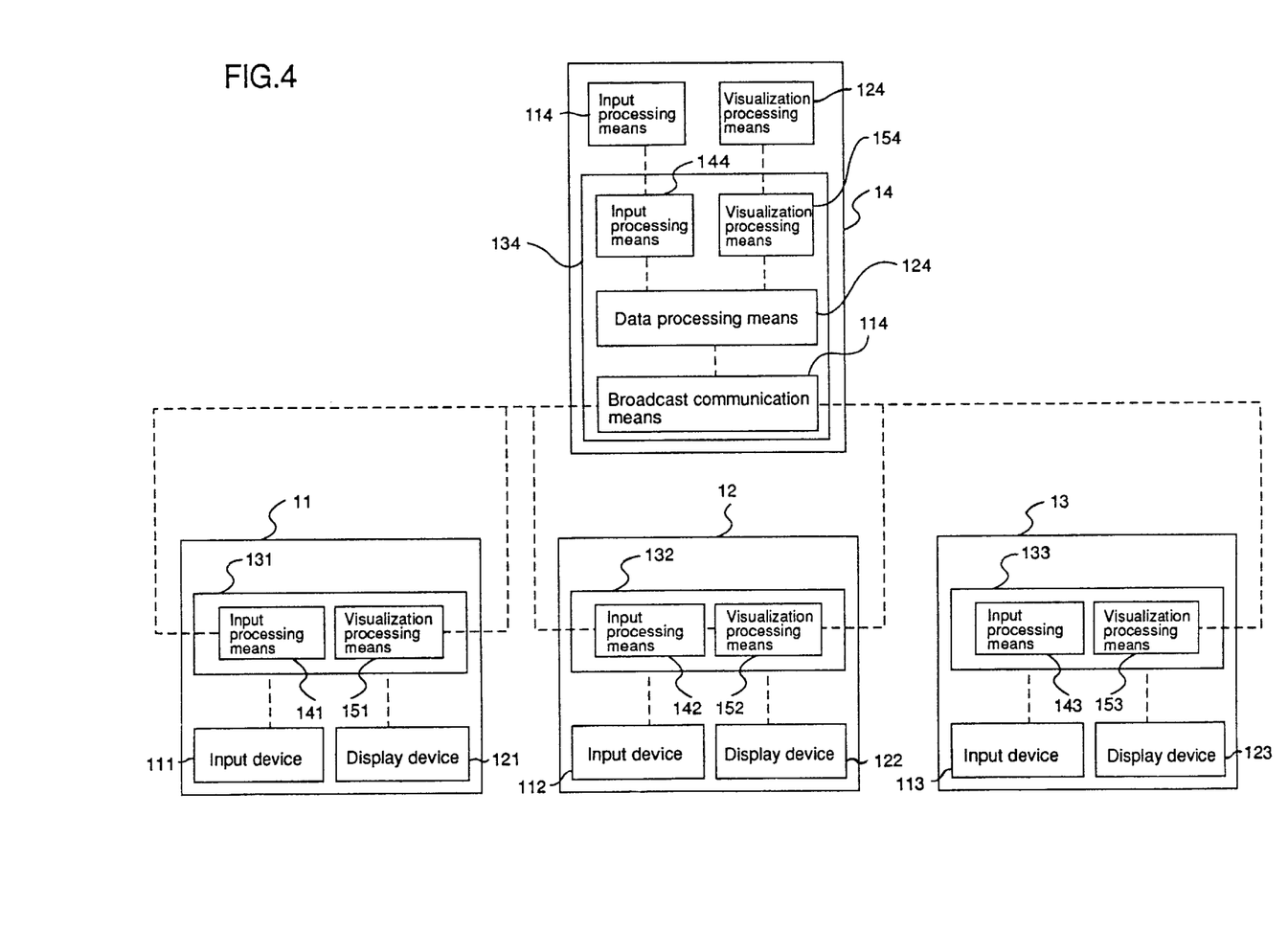
FIG. 4 is a block diagram showing the first embodiment of the present invention.

Furthermore, the same effect can be obtained if the broadcast communication control means 114 and the data processing means 124 exist in any terminal devices as shown in FIG. 4.

Figure 5:
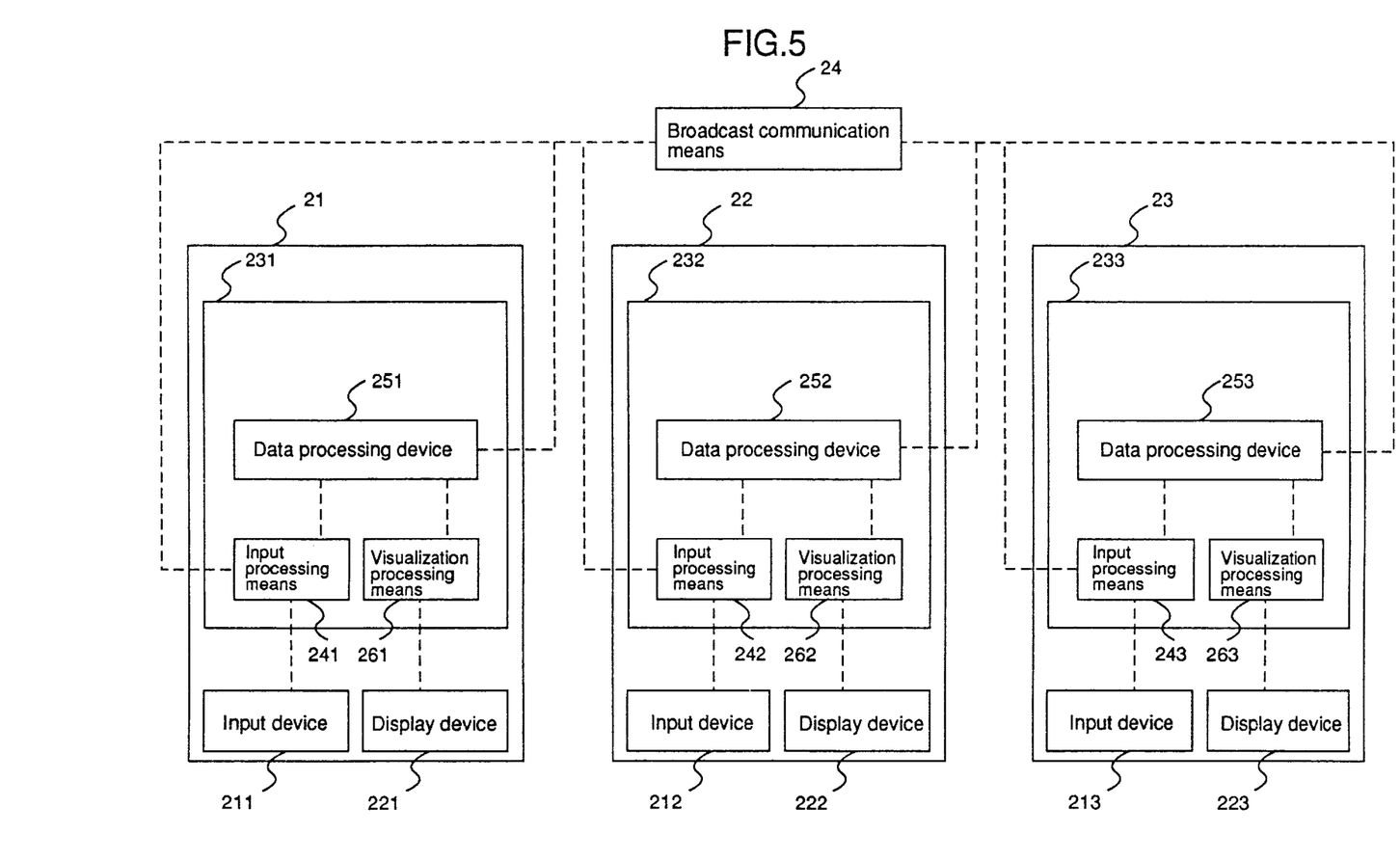
FIG. 5 is a block diagram showing the second embodiment of the present invention.
Figure 6:
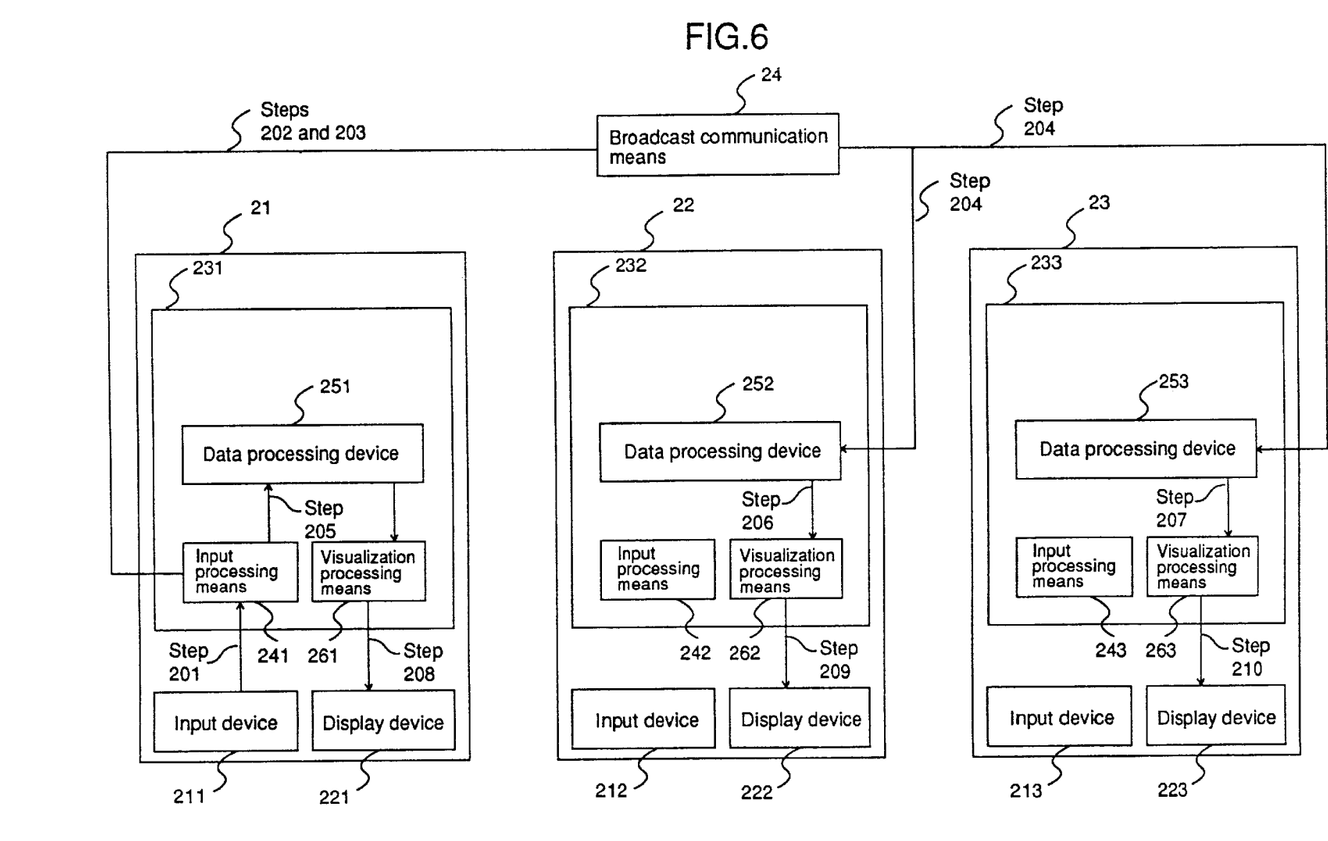
FIG. 6 is a chart showing a flow of information from the terminal device 21 to the terminal devices 22 and 23 in the second embodiment.
Figure 7:
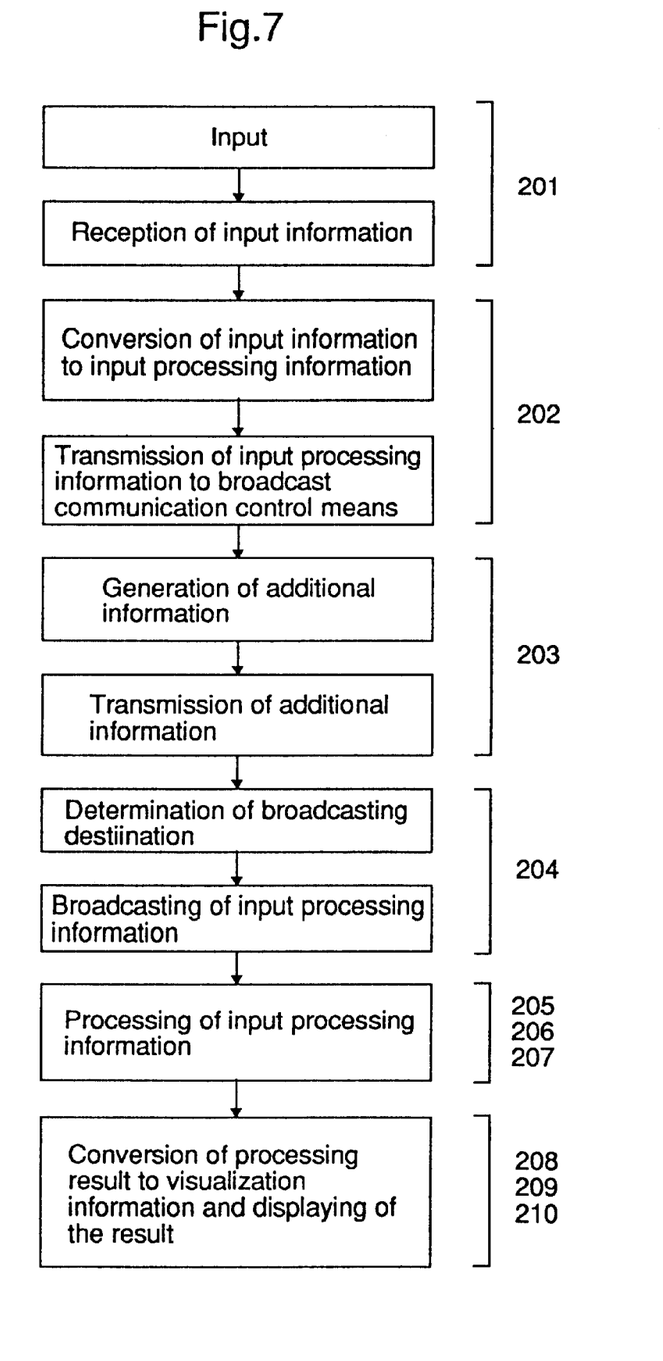
FIG. 7 is a chart of processing flow corresponding to each step of information flow shown in FIG. 5.

Next, the second embodiment of the present invention is explained referring to FIGS. 5–7.

FIG. 5 is a block diagram of the second embodiment.

In this figure, the first, second, and third 21, 22 and 23 are connected with the broadcast communication control means 24 via a network (ISDN or High-speed dedicated line).

The first terminal device 21 has an input device 211, a display device 221 and an information processing device 231.

The input device 211 is a device for inputting data, for example a keyboard or a mouse.

The display device 221 is a device for displaying a data processing result, for example, a CRT.

The information processing device 231 is configured from an input processing means 241, a data processing means or device 251 and a visualization processing means 261.

The input processing means 241 processes data input through the input device 211 and converts the data to an input processing information necessary for processing by a data processing device 251.

Specifically, 'the input processing information necessary for processing' is, for example, information requesting to execute an operation specified by clicking a command in a window on a CRT screen of the display device 221.

In this case, the command in the window displayed on the CRT is clicked at first using a mouse. Then, the input processing means 241 converts information show that the command has been clicked to information requesting the data processing means 251 to execute the operation specified by the command.

Further, the input processing means 241 generates additional information necessary for a broadcast communication control means 24 to broadcast the information. This additional information is, for example, an addressing information for addressing terminals to be broadcasted a processing result by the data processing means 251.

The data processing means 251 processes data based on an input processing information from the input processing means 241 or input processing information transmitted from the broadcast communication means 241 and outputs a processing result.

The visualization information conversion means 261 converts the data processing result from the data processing means 251 to visualization information specified by a user.

For example, if a user at the terminal device 21 requests to display the data processing result as a bar graph, the processing result, for example, numerical data from the data processing means 251 is converted to information for displaying a bar graph.

The second terminal device 22 also has an input device 212, a display device 222 and an information processing device 232 in the same way as the terminal device 21.

Also, the information processing device 232 has an input processing means 242, a data processing means 252 and a visualization processing means 262 in the same way as the information processing device 231.

Similarly, the third terminal device also has an input device 213, a display device 223 and an information processing device 233 in the same way as the terminal device 21.

Also, the information processing device 233 is configured from an input processing means 243, a data processing means 253 and a visualization processing means 263 in the same way as the information processing device 231.

The broadcast communication control means 24, broadcasts input processing information transmitted from an input processing means in an arbitrary terminal device to terminal devices addressed by the additional information transmitted with the input processing information.

Next, operation of the second embodiment is explained referring to FIGS 6 and 7.

FIG. 6 is a chart showing a flow of information from the terminal device 21 to the terminal devices 22 and 23 in the second embodiment.

FIG. 7 is a chart showing a processing flow corresponding each step of flow of information shown in FIG. 6.

A case of displaying the same data processing result displayed in forms of table and graph in the terminal devices as an example sharing a data processing result among terminal devices is considered in this embodiment, where the visualization processing means 261, 262, and 263 visualize the data processing result from the data processing means 251 in the form of table, bar graph and polygonal line graph.

First, when data is input to a table displayed by the display device 221 in the terminal device 21 from the input device 211, input information is input to the input processing means 241. (step 201).

The input processing means 241 determines how to process the input information and transmits input processing information necessary for the processing to the broadcast communication control means 24. (step 202).

Additionally, the input processing means 241 generates additional information for broadcasting the input processing information to the terminal devices 22 and 23, and transmits the additional information to the broadcast communication control means 24. (step 203).

The broadcast communication control means 24 broadcasts received input processing information to the data processing means 252 and 253 in the terminal devices 22 and 23. (step 204).

The data processing means 251 executes a calculation according to the received input information, passes a data processing result to the visualization processing means 261. (step 205).

The data processing means 252 receives the same input processing information processed by the data processing means 251 from the broadcast communication control means 24, executes a calculation according to the received input information, passes a data processing result to the visualization processing means 262. (step 206).

The data processing means 253 receives the same input processing information processed by the data processing means 251 from the broadcast communication control means 24, executes a calculation according to the received input information, passes a data processing result to the visualization processing means 263. (step 207).

The visualization processing means 261 performs visualization processing for displaying the received processing result as a table and makes the display device 221 display the table. (step 208).

The visualization processing means 262 performs visualization processing for displaying the received processing result as a bar graph and makes the display device 222 display the bar graph. (step 209).

The visualization processing means 263 performs visualization processing for displaying the received processing result as a polygonal line graph and makes the display device 223 display the bar graph. (step 210).

Thus, the same data processing result is displayed in different forms in respective terminal devices.

It is to be noted that, although the visualization processing means 261, 262 and 263 respectively perform one kind of visualization processing for each in this embodiment, however, it is possible for the visualization processing means to select arbitrary visualization processing to the same data such as table, bar graph, polygonal line graph or the like.

Furthermore, it is also possible to configure the visualization processing means 261, 262 and 263 enable to display the same text in different languages such as English, Japanese and German, other than numerical data.

In addition, it is possible to share the same displayed information by making the visualization processing the same.

Also the number of application programs run by a data processing device and that of terminal devices are not limited.

What is claimed is:

1. An information processing apparatus comprising:
 a broadcast communication means for broadcasting input processing information; and
 a plurality of terminal devices each including:
   an input processing means for processing data input to convert said data to said input processing information and outputting to said broadcast communication means;

a data processing device for receiving and processing said broadcasted input processing information;

a visualization processing means for converting said input processing information processed by the respective data processing device to a visualization information format, which includes a display in a form of table, bar graph, polygonal line graph, graph, and different language, specified by the respective terminal device, wherein said input processing information from any of said input processing means of said terminal devices is broadcastable to each of said data processing devices via said broadcast communication means so that all targeted terminal devices process the same input processing information.

2. The information processing apparatus of claim 1, wherein said visualization processing means converts said input processing information processed by said data processing device for displaying in different formats in the respective terminal devices.

3. The information processing apparatus of claim 1, wherein:

said input processing means generates an additional information for addressing terminal devices to be broadcasted said input processing information and transmitting said additional information and said input processing information simultaneously to said broadcast communication means; and said broadcast communication means transmits said input processing information to said data processing means in addressed terminal devices based on said additional information.

4. The information processing apparatus of claim 1, wherein each of said terminal devices comprises:

an input means for inputting said data; and a display means for displaying a visualized information based on said visualization information.

5. An information processing apparatus comprising:

a broadcast communication means for broadcasting input processing information; and a plurality of terminal devices, each including:

an input means for inputting data;

an input processing means for processing said input data to convert said input data to said input processing information and for simultaneously generating additional information to address each terminal device targeted for receiving said input processing information, and outputting to said broadcast communication means;

a data processing device for receiving and processing said broadcasted input processing information;

a visualization processing means for converting said input processing information processed by the respective data processing device to a visualization information format, which includes a display in a form of table, bar graph, polygonal line graph, graph, and different language, specified by a user of the respective terminal device; and a display means for displaying visualized information based on said visualization information format, wherein said input processing information from any of said input processing means of said terminal devices is broadcastable to each of said data processing devices via said broadcast communication means so that all targeted terminal devices process the same input processing information.

6. The information processing apparatus of claim 5, wherein said visualization processing means converts said input processing information processed by said data processing device for displaying in different formats in the respective terminal devices.

7. A method for processing information comprising the steps of:

converting, in an input processing means of one of a plurality of terminal devices, data input thereto to input processing information that can be processed by each data processing device of said terminal devices and outputting said input processing information to a broadcast communication means;

generating in said one of said terminal devices additional information addressing each terminal device targeted for receiving said input processing information from said one of said terminal devices and outputting to said broadcast communication means;

broadcasting said input processing information and the additional information to the data processing device of each targeted terminal device so that all targeted terminal devices process the same input processing information;

converting in each targeted terminal device said broadcasted input processing information processed by said data processing device to a visualization information format, which includes a display in a form of table, bar graph, polygonal line graph, graph, and different languages, specified by a user of each targeted terminal device.

8. The method for processing information of claim 7, further comprising a step of generating an additional information for addressing terminal devices to be broadcasted said input processing information in said (a) step.

9. The method for processing information of claim 7, further comprising a step of inputting data in said (a) step.

10. The method for processing information of claim 7, wherein said (e) step and said (f) step are steps of converting said data processing result to information for displaying it in different expressive forms in respective terminal devices.

11. The method for processing information of claim 7, further comprising:

(g) a step of displaying a visualized information based on said visualization information in said first terminal device; and (h) a step of displaying a visualized information based on said visualization information in each of said plurality of second terminal devices.

12. A method for processing information comprising the steps of:

inputting data in one of a plurality of terminal devices;

converting, in an input processing means of the respective terminal device, said input data to predetermined input processing information that can be processed by each data processing device of said terminal devices and outputting said input processing information to a broadcast communication means;

generating in said one of said terminal devices additional information addressing at least two of said terminal devices targeted for receiving said predetermined input processing information from said one of said terminal devices and outputting to said broadcast communication means;

broadcasting via said broadcast communication means said input processing information and the additional information to the data processing device of each of the targeted terminal devices so that all of the targeted terminal devices process the same input processing information;

converting in each of said targeted terminal devices said input processing information processed by said data processing device to a visualization information format, which includes a display in a form of table, bar graph, polygonal line graph, graph, and different language, specified by each of said targeted terminal devices; and displaying in each of said targeted terminal devices visualized information based on said visualization information format of each of said targeted terminal devices.

13. The method for processing information of claim 11, wherein said (i) step and said (j) step are steps of converting said data processing result to information for displaying it in different expressive forms in respective terminal devices.

* * * * *